J. M. C. ARMSBY.
Plow-Clevis.
No. 4,466. Patented Apr. 18, 1846.
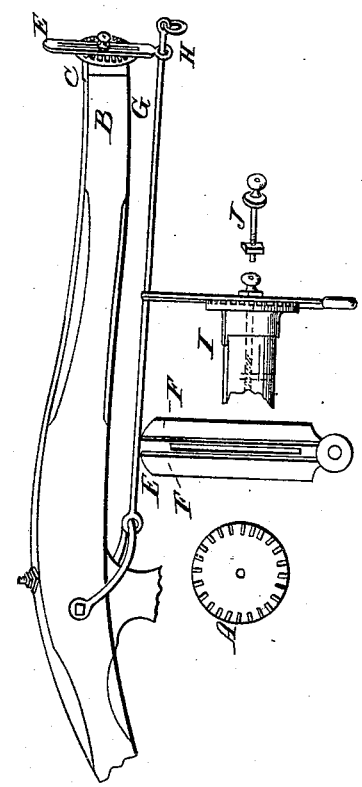

United States Patent Office.

RUGGLES, NOURSE & MASON, ASSIGNEES OF J. M. C. ARMSBY, OF WORCESTER, MASSACHUSETTS.

IMPROVEMENT IN REGULATING THE DRAFT OF PLOWS.

Specification forming part of Letters Patent No. 4,466, dated April 18, 1846.

*To all whom it may concern:*

Be it known that I, JOSHUA M. C. ARMSBY, of Worcester, in the county of Worcester and State of Massachusetts, have invented a new and useful Improvement in the Way and Manner of Guiding and Regulating the Operation of Plows, by which to cause them to cut any desirable width of furrow-slice and depth of furrow; and I do hereby declare that the following is a full, clear, and exact description thereof, reference being had to the accompanying drawing, which forms a part of this specification.

A is a plate of iron or other metal, on one side of which is made or cast a socket, into which the forward end of the plow-beam B is fitted, as shown at C, and is so formed as to prevent its being moved or turned laterally on the end of the beam by the power of the team; or the plate may have one or more projections, which may be inserted or let into the end of the beam, or otherwise so formed as to prevent its being moved or turned laterally.

On the other or front side of the plate described are teeth, cogs, or projections, as shown on the detached plate A on the drawing. On the front side of the plate is placed a sliding guide, E, made of iron or other metal, with splines, ribs, or projections, as shown at F F, which mesh into or pass between the cogs, teeth, or projections on the plate in such manner as to prevent the guide also from being moved sidewise or laterally when confined together and to the end of the beam by a joint-bolt, as hereinafter described.

Through the lower end of the guide is a hole, through which the draft-rod G passes, as shown at H, above which is a slot in the guide, through which and the plate passes a joint-bolt entering into the end of the beam, which confines the plate and guide firmly, as shown by the detached part of the drawing, I. The bolt is more fully shown by the detached drawing, J. By loosening the joint-bolt the lower end of the sliding guide may be easily and quickly raised or lowered and revolved to the right or left, as may be required to cause the plow to take any desired width of furrow-slice or depth of furrow, when they are again made fast in the position in which they are placed by tightening the joint-bolt.

What I claim as my invention, and for which I desire to secure Letters Patent, is—

The circular plate with the cogs, teeth, or projections thereon, in combination with the guide having ribs, splines, or projections on it, in the manner and for the purpose described, to prevent the lower end of the guide being moved laterally or sidewise by the power of the team.

JOSHUA M. C. ARMSBY.

Witnesses:
CHARLES SANDERS,
EDWD. EARLE.